United States Patent [19]

Bernard et al.

[11] Patent Number: 5,098,035
[45] Date of Patent: Mar. 24, 1992

[54] HELICOPTER TRAVERSAL SYSTEM

[75] Inventors: Louis A. Bernard, Saint-Victoret; René Thomassin, Velaux, both of France

[73] Assignee: Aerospatiale Societe Nationale Industrielle, Paris Cedex, France

[21] Appl. No.: 676,417

[22] Filed: Mar. 28, 1991

[30] Foreign Application Priority Data

Mar. 29, 1990 [FR] France ............................. 90 04039

[51] Int. Cl.$^5$ .............................................. B64F 1/12
[52] U.S. Cl. .................................. 244/116; 114/261; 180/904
[58] Field of Search ................. 244/17.17, 50, 110 E, 244/114 R, 115, 116; 180/904; 114/261

[56] References Cited

U.S. PATENT DOCUMENTS

| | | | |
|---|---|---|---|
| 3,640,490 | 2/1972 | Baekken | 244/116 |
| 3,790,111 | 2/1974 | Mesnet et al. | 244/116 |
| 3,830,452 | 8/1974 | Seay | 244/116 |
| 4,319,722 | 3/1982 | Pesando | 244/116 |
| 4,529,152 | 7/1985 | Bernard | 244/116 |
| 4,883,280 | 11/1989 | Christian | 244/50 |

FOREIGN PATENT DOCUMENTS

| | | |
|---|---|---|
| 2462341 | 2/1981 | European Pat. Off. |
| 0103519 | 3/1984 | European Pat. Off. |

*Primary Examiner*—Joseph F. Peters, Jr.
*Assistant Examiner*—Carla Mattix
*Attorney, Agent, or Firm*—Armstrong, Nikaido, Marmelstein, Kubovcik & Murray

[57] ABSTRACT

A device for maneuvering a machine supported by a principal landing gear and at least one swingable wheel, such as a helicopter, between two given zones on a platform such as an alighting area and a parking area on the deck of a ship. The device includes at least one guide rail (5, 6), a hauling mechanism (12, 13, 14, 19, 20) intended to pull the machine (H), and a bar (19) for orienting the path of the machine (H). One end of the bar slides along the guide rail (5). The device also has at least one holding trolley (28) associated with means of connection (30, 31, 32, 33, 34, 35, 38, 39) to the machine (H). These means of connection make it possible to center and align the machine (H) on the guide rail (5, 6) as it is being hauled.

15 Claims, 5 Drawing Sheets

HELICOPTER TRAVERSAL SYSTEM

OBJECT OF THE INVENTION

The present invention relates to a device for maneuvering a machine supported by a principal landing gear and at least one swingable wheel, such as a helicopter, between two pre-determined zones on a substantially plane platform, such as an alighting area and a parking area on the deck of a ship. In particular, the swingable wheel or wheels may be that or those of an auxiliary non-piloted front undercarriage of a tricycle landing gear, or else the swingable tail or rear wheel of a helicopter whose principal landing gear comprises two forward lateral undercarriages.

Nowadays, many ships, such as warships, industrial trawlers, survey or prospecting vessels, e.g. for oilfields, or even drilling rigs, are laid out so that they can receive helicopters and possibly garage them. For that, they are generally equipped with platforms fitted with alighting aid devices and/or with safety devices intended to reduce the risk of accidents in cases respectively of alightings made difficult by poor weather conditions and/or of maneuvering helicopters over the platforms.

PRIOR ART

Such a safety device has especially been described already by the Applicant in its patent FR-2.532.910, which refers to a maneuvering device making it possible to ensure the movement of machines on a flat platform between two zones thereupon, such as a take-off and landing area and a garaging area. In particular, the device described in this patent comprises a guide rail extending from one of the said zones to the other and along which there is intended to be moved a guide trolley fitted with a unit for connection to the helicopter, which is secured to a point of attachment on the fuselage of the said helicopter.

The helicopter, once it has alighted on the platform, is pulled, in its movement from one zone to the other of the said platform, by means for hauling, and is directed in its movement by means of a guide bar connected at one of its ends to the swingable front wheel or wheels or to the swingable rear wheel of the said helicopter, in such a way that the axis of the said bar always lies approximately in the median plane of the said wheel or wheels, its other end sliding in the said guide rail. Because of this, the helicopter, which is held vertically and centering over the guide rail by the abovementioned trolley, is automatically and progressively lined up with the guide rail at the start of its movement.

However, such a device requires, prior to this, that the helicopter, after having set down on the platform, shall be maneuvered in order that the point of attachment on its fuselage lies very exactly vertically above the guide trolley. In one of the embodiments proposed by this patent FR-2.532.910, the helicopter remains held on the platform during this maneuver, thanks to a known alighting aid system of the "harpoon-grid" type, the helicopter alighting on the said grid, being fixed to this grid by its harpoon and then pivoting around the said harpoon until the point of attachment of its fuselage to the guide trolley lies vertically above the guide rail.

Such a safety device thus requires special equipment for the platform and the helicopter. The platform must, in effect, be fitted with an alighting grid. Moreover, it cannot be used by standard helicopters not fitted with a harpoon.

A safety device of another type has also been described in the published patent application FR-2.234.190, which for its part refers to a device comprising, on a platform, a guide rail along which moves a trolley pulled by a cable passing into the rail and wound on a winch. This trolley is fitted with a pivotinq sleeve, suitable for pivoting on the said trolley around a vertical axis, and in which is mounted, so as to slide, a box girder fixed by its two ends to the axes of the wheels of the principal undercarriages. This box girder, with telescopic ends, is provided along its length with teeth intended to engage with an immobilizing ratchet mounted on the sleeve in order to lock the girder with respect to the said sleeve and thus with respect to the trolley, after prior alignment of the helicopter along the straight rail. The device also comprises two lateral winches on which are wound two cables attached to both sides of the aft section of the fuselage of the helicopter in order to permit the alignment of the latter on the rail, the said helicopter being towed after the stage of alignment and of locking by means of the box girder and the trolley.

However, the operation of aligning the helicopter by lateral winches, which is a long and tedious operation, is necessarily carried out before being able to begin towing the helicopter. Moreover, such a device, which comprises among other things a mechanism with solenoids and related electrical circuits, in order to control the ratchet and the attachment of the sleeve to the box girder, is bulky, complex and fragile. In addition, it should also be noted that such a device is more especially intended for helicopters with rear auxiliary undercarriage (tail wheel), and requires an adaptation of the principal landing gear in order that the box girder may be fixed to it. Finally, this device is used in conjunction with an alighting aid device of a type other than the harpoon-grid type but requiring yet greater alterations than the latter on the platform and beneath it.

One object of the invention is to provide a device for maneuvering a helicopter on the deck of a ship making it possible to overcome the abovementioned drawbacks of the devices proposed by the above-mentioned patent FR-2.532.910 and patent application FR-2.234.190. The invention especially provides a very simple system, as regards both the tools and the equipment of the ship that it requires, and thanks to which the helicopter is, after it has alighted, held vertically against any overturning and horizontally against any slipping, and simultaneously is on the one hand towed towards, for example, the garaging hangar and on the other is centered and aligned with the guide rail without any prior maneuver of the helicopter being necessary.

SUMMARY OF THE INVENTION

More particularly, the invention provides a device which requires on the ship, apart from at least one guide rail and lateral towing winches, (which constitute items of equipment that are cheap and easy to install on ships initially lacking them, whereas ships intended to receive helicopters are fitted with such items as standard items), only one orientation bar sliding by one of its ends along a guide rail and means for holding and guiding the machine on the rail. These means for holding and guidance consist, according to the invention, of a non-towed holding trolley, which is guided and retained vertically by the rail, and on which is mounted a vertical pivot rotating through 360° surmounted by a bearing whose axis is perpendicular to the axis of the said pivot, and in which freely slides a horizontal arm with automatic locking in the axis, whose ends are fixed on the sides of the helicopter fuselage on structural mooring points disposed near the root of the principal landing gear. During the movement of the helicopter from its alighting zone to its parking zone, the helicopter, pulled by the orientation bar, whose end guided in the rail is towed by a cable passing into this rail and wound round a winch, is progressively aligned with the guide rail, the sliding arm then becoming automatically centered with respect to the holding trolley by locking itself with respect to the latter as soon as it is in a position where the helicopter is substantially aligned with the said guide rail. During the whole maneuver, the helicopter is thus held strictly vertically on the deck, which avoids any tendency to overturn under the effects of movements of the ship and/or of the relative wind, and is held strictly horizontally, which avoids any slipping.

In addition, another advantage of the device provided by the invention stems from the fact that the holding arm is not connected to the wheels of the principal undercarriages of the helicopter, but to structural points on the sides of the fuselage, and from the fact that possible lateral oscillations of the helicopter on the principal undercarriages, under the effect of rolling motion of the ship and/or gusts of wind are precluded because of this. In particular, the device in accordance with the invention enables the helicopter to be handled with average seas and winds (a force 4 sea and a wind from 4 to 6 on the Beaufort scale), and with at least roughly ±8° of roll, roughly ±3° of pitch and a 30-knot wind at roughly 30° from the nose of the helicopter, these values being given as illustrative examples and being susceptible to changes depending on the type of helicopter and the dynamic characteristics of the support ship.

The subject of the present invention is therefore in a device for maneuvering a machine supported by a principal landing gear and at least one swingable wheel, such as a helicopter, between two pre-determined zones on a substantially plane platform, such as an alighting area and a parking area on the deck of a ship, this device comprising at least one guide rail extending from one zone of the platform to the other, a hauling mechanism adapted to pull the machine from one zone to the other, a bar for orienting the path of the machine, intended to be connected by one of its ends to the said machine, its other end sliding along the guide rail, and at least one holding trolley suitable for movement along the guide rail, this holding trolley being associated with means of connection to the machine, the improvement consisting in that the means of connection comprise:

- a holding arm associated with means of attaching each of its ends to one at least of the lateral mooring points on the machine which are disposed on both sides of a vertical median plane of the machine and with means of supporting each of its ends on the plane platform;
- a connecting unit mounted on the holding trolley on which the said holding arm may slide between its two ends, the said connecting unit maintaining the said holding arm with respect to the said holding trolley;
- means for automatically locking the said connecting unit with respect to the holding arm in a position corresponding substantially to the centering of the machine on the guide rail;
- means for pivoting which permit the pivoting of the holding arm with respect to the holding trolley around an axis substantially perpendicular to the platform.

Advantageously, the end of the orientation bar connected to the machine is connected to the said swingable wheel. The orientation bar may be articulated so as to pivot with respect to the said swingable wheel, the said device comprising means for automatically locking the orientation bar with respect to the said swingable wheel in a position in which the axis of the said orientation bar lies substantially in a plane parallel to, or coincident with the median plane of the said swingable wheel. The orientation bar may be connected to the said swingable wheel by means of a fork mounted on the axis of the said swingable wheel. The orientation bar may be articulated so as to pivot on the fork. The orientation bar may be of adjustable length and in particular it may be telescopic.

Preferably, the hauling mechanism comprises, towards one end of a guide rail, a towing winch on which is wound a cable connected to a mounted towing trolley, moveable along the guide rail and on which is articulated the orientation bar at its end furthest from the machine, the orientation bar thus being used as a towing bar for the machine. The guide rail is a hollow rail within which the cable connected to the towing trolley extends. The device may also comprise two lateral winches on which are wound cables intended to be connected laterally to the machine, these two lateral winches being disposed on the platform in whichever of the two zones is opposite the zone in which the towing winch is disposed, so that these two lateral winches may function as drag or braking winches when a towing winch or motor pulls the helicopter from one zone to the other, and conversely during movements in the opposite direction.

Advantageously, the lateral mooring points, on which the ends of the holding arm are attached, are close to lateral supporting struts of the wheels of the principal landing gear. The mooring points are structural mooring points on the fuselage of the machine. The means of attachment of one end of the holding arm to a mooring point may comprise at least one rod, adjustable in length, to enable the device to be adapted to the machine.

Preferably, once again, the holding arm is equipped, towards one of its ends, with at least one wheel intended to rest on the platform. On the holding trolley may be mounted a pivot which carries a cylindrical or parallelepipedal-shaped bearing with its axis substantially perpendicular to the axis of the pivot, the said bearing receiving into its interior the holding arm and being the connecting unit with respect to which the said holding arm is mounted so that it can slide.

Advantageously, once again, the means for locking comprise a pin extending, in the locked position, partially into a first recess cut into the connecting unit and partially into a second recess cut on the holding arm, the said pin being completely disposed in the unlocked position in one of these two recesses and being associated with elastic means tending to push it out of the said recess towards that of the connecting unit or of the holding arm in which the other recess is cut. The recess in which the pin is disposed in its unlocked position may be cut into the connecting unit, in which case the pin may be easily associated with means for manually unlocking the means of automatic locking of the said connecting unit with respect to the holding arm. The means for manual unlocking may comprise an outer pull handle connected to the pin and intended to be grasped by an operator.

Advantageously, once again, the device comprises auxiliary means for guiding the swingable wheel or wheels along the guide rail. The said auxiliary means may consist of a small orientation bar and comprise a fork intended for mounting on the axis of a swingable wheel, the said fork being provided at one of its ends with a roller sliding along the guide rail, in the part of the latter which is situated on the other side of the swingable wheel or wheels with respect to the part of the guide rail in which are guided the towing trolley and the corresponding end of the orientation bar. The small bar in the shape of a fork is only used in order to guide the swingable wheel during movements from the parking zone to the alighting zone, being also used at take-off, the hauling of the helicopter in this direction of motion being ensured by lateral winches, which function as towing winches or engines, whereas the winch mounted at the corresponding end of the guide rail functions as a drag or braking winch. In order to attach to the helicopter the cables maneuvered by the lateral winches, rings are used which project laterally outwards on the ends of the axes of the wheel or wheels of the lateral principal undercarriages of the helicopter, so that these cables are not protected in specific guides on the platform, unlike the cable maneuvered by a winch disposed at the end of a guide rail, which is lodged in this hollowed-out rail, which may be integrated into the platform if the device was originally mounted on the platform, or added on to the platform so that it projects, if the device was not initially integrated into the latter.

The description which follows is given as a purely illustrative and non-restrictive example. It must be read in conjunction with the appended drawings.

DETAILED DESCRIPTION OF THE INVENTION

Figure 1:
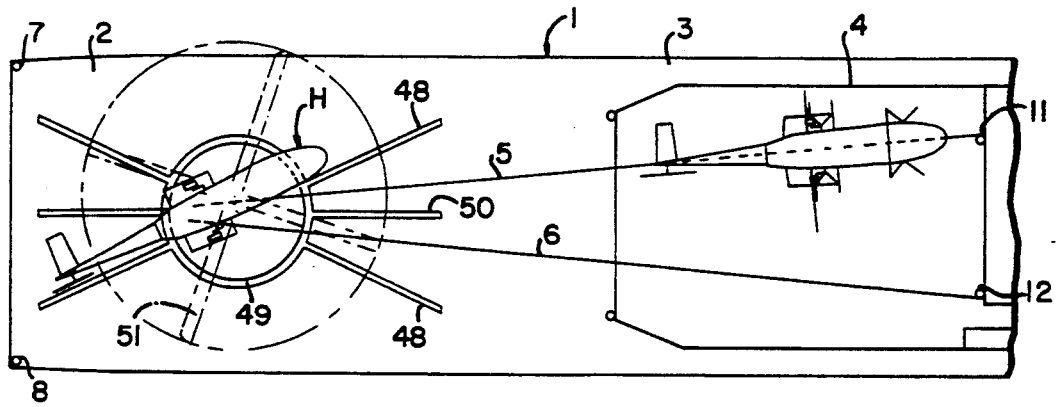
FIGS. 1 to 6 are diagrammatic plan views of different steps in maneuvering a helicopter during its alighting and its transfer from its alighting area to its parking area in the case of a platform capable of receiving two helicopters.
Figure 2:
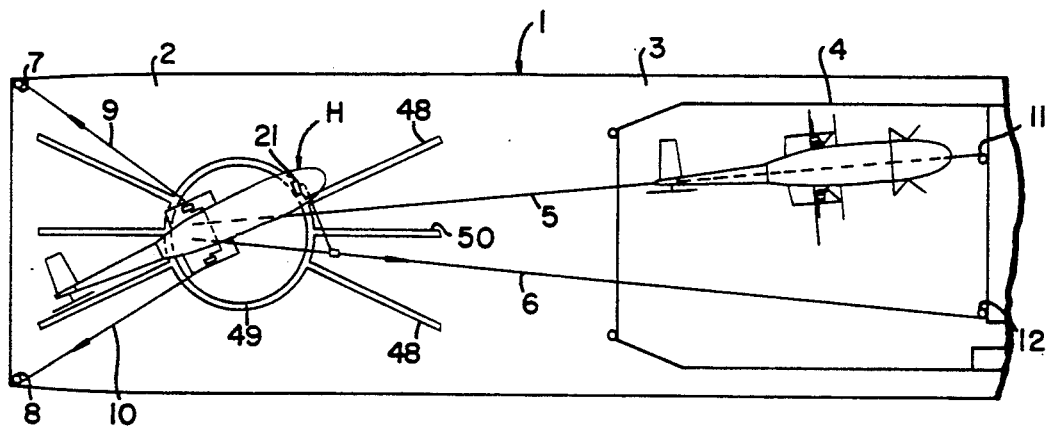

It can be seen in these figures that the device in accordance with the invention comprises mainly, on the ship, a platform generally referenced 1 and comprising, on the one hand, an alighting and take-off area 2 and, on the other hand, a parking area 3 on which is disposed a hangar 4. On this platform 1, there extend, from the alighting and take-off area 2 to the end of the hangar 4, two guide rails 5 and 6. These two guide rails 5 and 6 are two hollow rails, which may or may not be integrated with the deck of the platform 1. They have a rectangular cross-section whose upper wall is traversed by a groove which opens on to the outer surface of the platform 1. These two rails 5 and 6 are, in addition, either straight or slightly curved and extend in a fan-like way from the alighting area 2 to the hangar 4, symmetrically with respect to the median line of the ship. In the case of a platform which can receive only a single helicopter, there would of course be only one rail 5 or 6.

To the rear of the alighting area 2, on the side of the said area 2 which is furthest from the hangar 4, there are disposed, laterally on both sides of the platform 1, two lateral winches 7 and 8, associated respectively with cables denoted by the reference numbers 9 and 10, one end of each of which is intended to be integrated laterally with the helicopter, for example by attaching it to a ring generally provided so as to project on the outer end of the axis of the wheel or wheels of the principal undercarriage of the helicopter. In the hangar 4 is disposed, at the end of each of the guide rails 5 and 6, a hauling winch 11 or 12. Each winch is associated with one towing cable, this cable for the winch 12 being given the reference number 13 (see FIG. 10). This cable 13 extends from the winch 12 to a towing trolley 14, which is mounted so as to move along a rail 5 or 6, and it is attached to the trolley 14 by its end that is not wound on the winch 12, while being guided and protected inside the hollow rail 6. Each trolley 14 consists essentially of a principal parallelepiped-shaped body mounted in the hollow rail 5 or 6 in which it is retained and associated with vertical supporting rollers 15 disposed at its four corners, these vertical rollers rolling along the bottom of the said hollow rail 6, and with horizontal guiding rollers 16 against the sides of the rail. On the upper part 17 of the trolley 14, which projects slightly outside the rail 5 or 6, is mounted a towing and orientation bar 19 articulated on a swivel joint 18.

This towing bar 19 is a telescopic bar on which is articulated, so as to pivot, a U-shaped fork 20, intended to be attached by its branches to the common axis of the two twinned and swingable front wheels 21 of the non-piloted forward auxiliary undercarriage of the helicopter H. The towing bar 19 is articulated so as to pivot with respect to the fork 20 around an axis 22 disposed on an extension 23 extending from the central part of the said fork 20, on the side opposite the lateral branches of the said fork 20 and symmetrically with respect to the latter. The said extension 23 and the towing bar 19 are equipped with standard means 24, such as a pawl elastically returned to a complementary recess, enabling the said fork 20 and the towing bar 19 to be automatically locked with respect to each other, when the median line of the two lateral branches of the said fork 20 lies substantially along the extension of the said towing bar 19.

The device in accordance with the invention also comprises a fork-shaped mini-guide-bar 25 intended to become fixed by its branches on to the ends of the branches of the fork 20. This mini-guide-bar 25, in place on the said twinned wheels 21, extends on the side opposite to the fork 20 with respect to the wheels 21, from the axis of the said wheels 21 to a roller 26 or small guide trolley with which it is equipped at one of its ends, the said roller 26 or small guide trolley being introduced into, and sliding along, the hollow guide rail 6; this mini-guide-bar 25 is used only for transferring the helicopter from the parking zone to the take-off zone.

More particularly, it can be seen in FIGS. 12 to 15 that the device in accordance with the invention also comprises means 27 for holding and guiding the helicopter H with respect to the guide rail 5 or 6. These means for holding 27, which form an original part of the device in accordance with the invention, comprise a holding trolley 28 moving, thanks to four vertical wheels 29, in the guide rail 5 or 6, whose upper wall maintains it vertically with respect to the platform 1, and two horizontal guide rollers 29a. On this holding trolley 28 is mounted a vertical pivot 30, held in place on the upper part 31 of the said trolley 28, which protrudes outside the guide rail 6, by the cooperation of its foot 32 and the inner walls of a hollow socket 33 fixed on the said upper part 31 and in which the said foot 32 is mounted. This pivot 30 can swivel through 360° with respect to the said socket 33 and the holding trolley 28. It is in addition surmounted by a hollow cylindrical or parallelepiped-shaped bearing 34 whose axis is perpendicular to the axis of the pivot 30 and in which freely slides a holding arm 35 which is a hollow cylindrical-or parallelepipedal-shaped tube. Each of the two ends of the cylindrical bearing 34 is associated with an anti-friction slip ring 34a, the bearing 34 and the two rings 34a together forming a double bearing. Each of the two ends of the arm 35 is associated with a support or fork 36 in which a wheel 37 is mounted so as to pivot. The two wheels 37, with which the arm 35 is thus equipped, are intended to rest on the platform 1 in order to roll on the latter, support the ends of the said holding arm 35 and prevent any vertical movement of this holding arm 35.

In addition, on each of the ends of the holding arm 35 is articulated, above each of the wheels 37, a rod of adjustable length 38 attached at its other end to a structural mooring point 39 on the helicopter H, the said helicopter H being equipped for this, on each of its sides, with a structural mooring point 39, for example on the component for fixing the main undercarriage 40 to the fuselage on the corresponding side.

Figure 12:
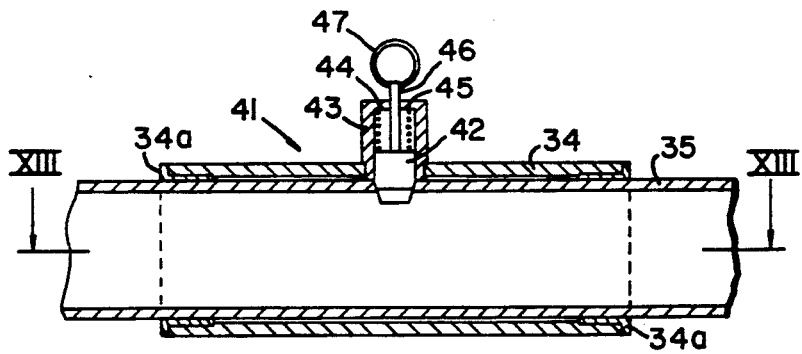
FIG. 12 is a partial view of another detail of the device in accordance with the invention.
Figure 13:
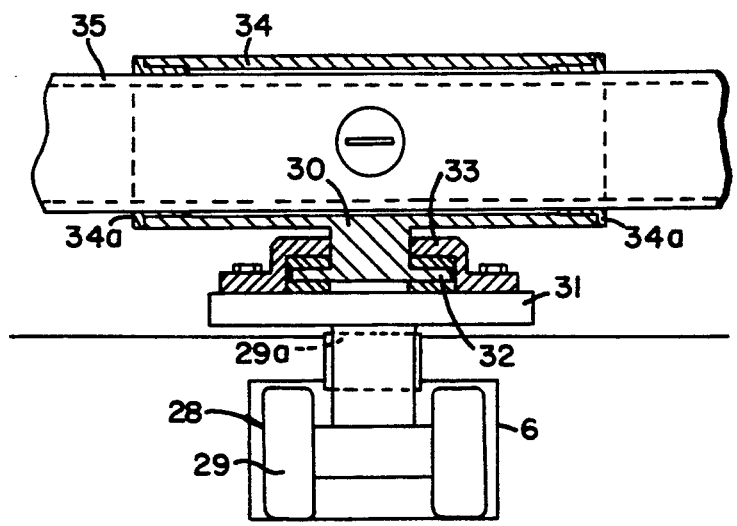
FIG. 13 is a view along the line XIII—XIII of FIG. 12.
Figure 14:
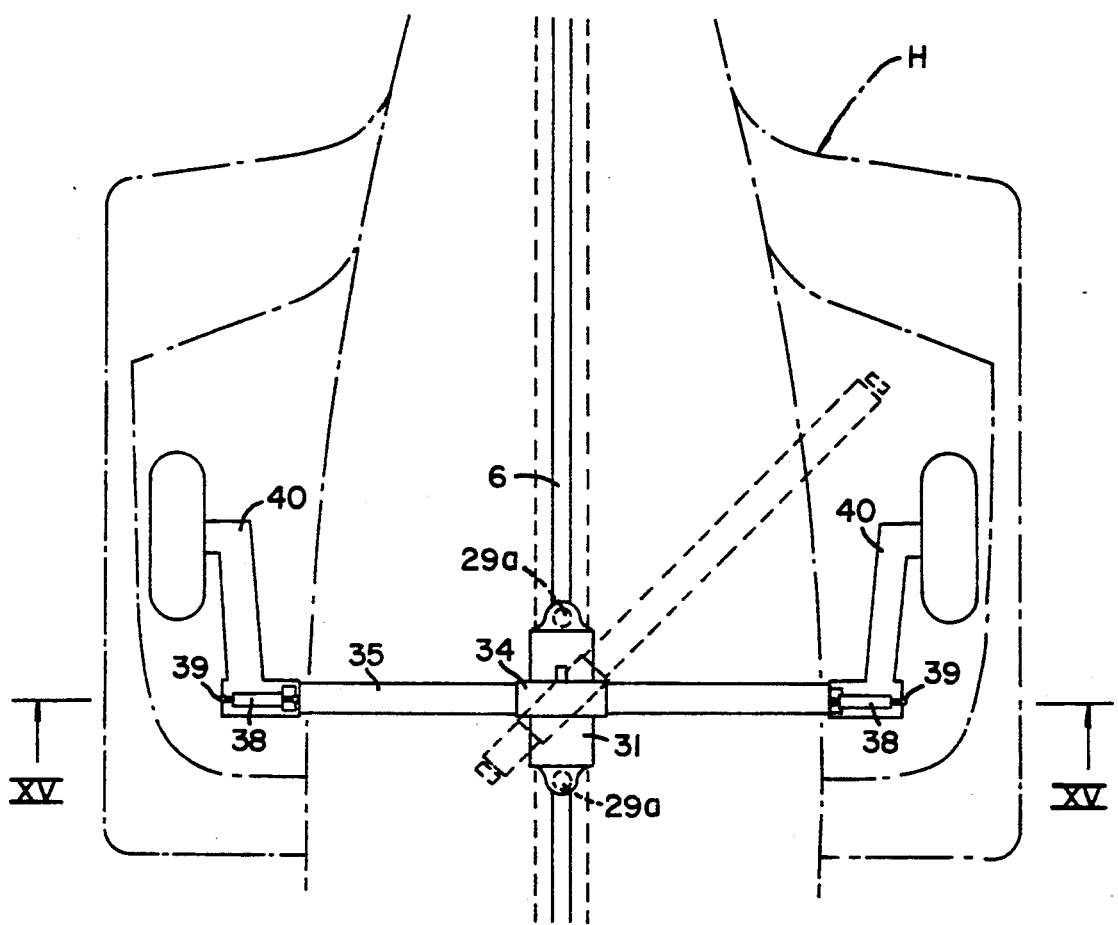
FIG. 14 is a diagrammatic view of yet another detail of the device in accordance with the invention.
Figure 15:
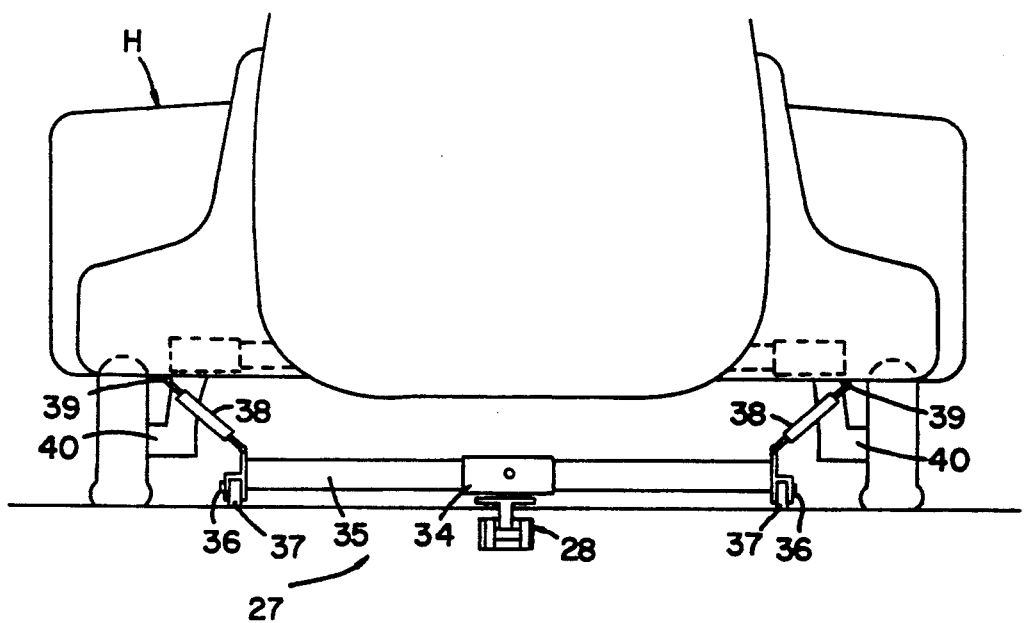
FIG. 15, finally, is a view along the line XV—XV of FIG. 14.

Referring more especially to FIGS. 12 and 13, it is seen that the holding arm 35 and the cylindrical or parallelepiped-shaped bearing 34 are associated with means of locking, denoted in their entirety by the reference number 41, enabling these two components to be automatically locked to each other in a pre-determined position. These means of locking 41 comprise, in particular, a cylindrical pin 42 mounted so that it slides in a complementary bore 43, which is a hollow recessed cylindrical casing associated with the bearing 34 into which it opens out at one of its ends. This casing 43 projects radially outwards with respect to the bearing 34. Between the bottom 44 of the said casing 43 and the pin 42 is disposed a compressed helical spring 45, whose action pushes the said pin 42 out of the casing 43. The wall of the arm 35 is pierced, midway along the length of this arm 35, by a circular aperture whose inner diameter substantially corresponds to the outer diameter of the pin 42. When the casing 43 and the said aperture in the arm 35 are facing one another, the pin 42 pushed by the spring 45 becomes partly lodged in the said aperture in the arm 35 and also extends partly into the said casing 43, so that the said bearing 34 and the holding arm 35 are locked together.

In addition, the pin 42 is extended axially by a rod 46 extending from its face upon which the spring 45 comes to bear to beyond the bottom 44 which it passes through, this rod 46 being terminated at its end outside the casing 43 by a ring 47 which an operator can manipulate in order to extract the pin 22 from the aperture in the arm 35 by pulling on the said ring 47 to compress the spring 45 by the pin 42.

On the alighting area 2, there is also disposed a marking which visibly delineates the periphery of a circle 49 with a diameter of about 7 m centered on a point lying between the two guide rails 5 and 6 on the line 50 midway between the said two rails. The marking also delineates on this alighting and take-off area 2 two lines for alignment 48 disposed at roughly 25° from the said median line 50.

Such a maneuvering device is used in the way that will now be described. In FIGS. 1 to 6 has been represented more especially the transfer of the helicopter from its alighting area 2 to its hangar 4.

It is seen, particularly in FIG. 1, that the helicopter H alights on the alighting area 2, aligning itself along the axis of the ship or along one of the marking lines 48, the pilot's seat being approximately above the periphery of the circle 49, the wheels 21 of the forward undercarriage then being locked in the axis of the helicopter H. In calm seas, the pilot has the possibility of making his machine taxi with rotor turning and wheels 21 unlocked in order to bring the wheels 21 into the vicinity of the rail 6 by making the helicopter H pivot about itself, if it is assumed that the position in the hangar 4 corresponding to the rail 5 is already occupied by another helicopter.

The engines are then stopped. The operators of the platform 1 then come to moor the helicopter H by the rings situated on the axis of the wheels of the principal landing gear 40, and to secure the helicopter H on the platform 1 by two forward lateral structural points and two rear lateral structural points (not shown), and the main blades 51 of the machine are then folded. In rough seas, the helicopter H is secured to the platform as soon as it has alighted without making it pivot on itself.

Preparations are then made for the handling of the machine H by carrying out the following tasks (FIG. 2):

the holding trolley 28 is brought under the fuselage of the helicopter H by moving it in the rail 6;

the towing trolley 14 is brought near to the helicopter H, also by moving it in the rail 6;

the holding arm 35 is fixed by means of adjustable rods 38 on to the structural mooring points 39, after having made the arm 35 slide in the bearing 34 and having pivoted the latter with the pivot 30 with respect to the trolley 28 as much as is necessary, taking into account the positions occupied by the principal undercarriages 40 on both sides of the rail 6;

the auxiliary undercarriage is unlocked for directional rotation;

the towing bar 19 is fixed, by means of the fork 20, on to the wheels 21 of the forward auxiliary undercarriage of the helicopter H;

the cables 9 and 10 of the rear lateral winches 7 and 8 are fixed on to the rings of the wheels of the principal landing gear 40;

the moorings are set up;

the cables 9 and 10 of the rear lateral winches 7 and 8 are progressively put under tension, together with the cable 13 of the forward towing trolley 14, the forces producing tension being of course adjusted as a function of the type and weight of the helicopter H.

As an illustrative example, for a helicopter of average tonnage, the winches 7 and 8 will exert drag and braking forces of 500 daN on the cables 9 and 10, the tension in the cable 13 being 1000 daN.

Figure 3:
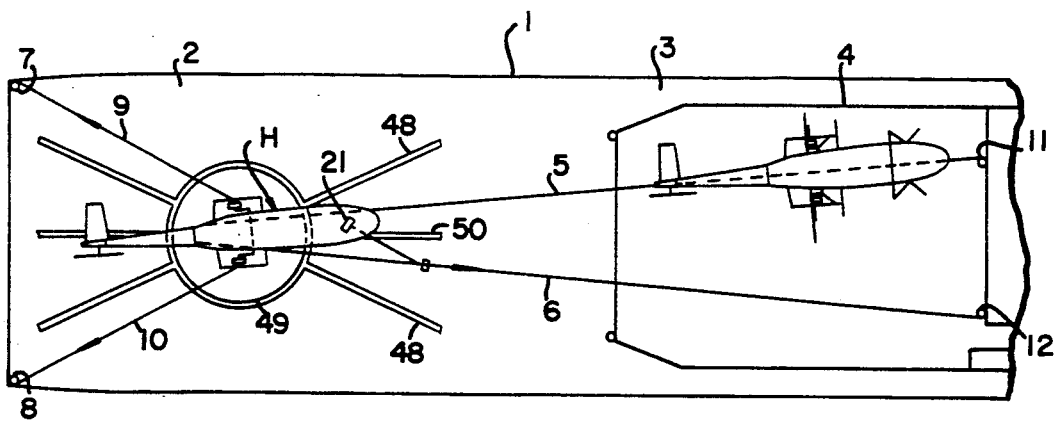
Figure 4:
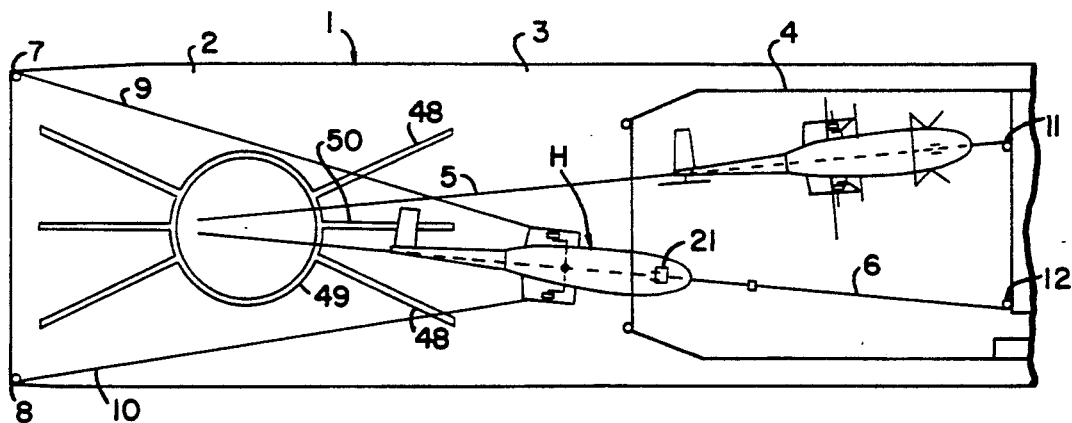
Figure 5:
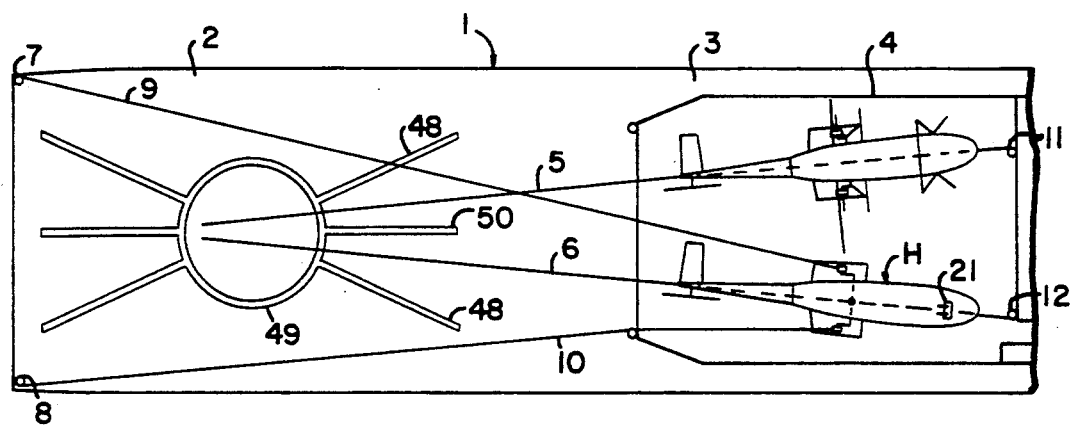

Once this preparation has been carried out, the maneuvering can commence (FIGS. 3 and 4). To achieve that, the helicopter H is made to advance towards the hangar 4 by progressively increasing the force on the cable 13 up to, e.g. for the abovementioned type of helicopter, a maximum of 1500 daN. The centering of the helicopter H on the guide rail 6 is then carried out automatically during the movement of the machine. The holding arm 35 is, for its part, locked automatically with respect to the bearing 34 and thus to the holding trolley 28 when the helicopter H lies in the centered position with respect to the guide rail. The towing bar 19 and the fork 20 are locked together when the said towing bar 19 is aligned along the median line of the two arms of the fork 20. The maneuvering will then be stopped a little before the end of the hangar 4 in order to contract the telescopic towing bar 19, this being done particularly in the case where the hangar 4 is not very long. The helicopter H is then made to advance up to its mooring position in the hangar (FIG. 5).

Figure 6:
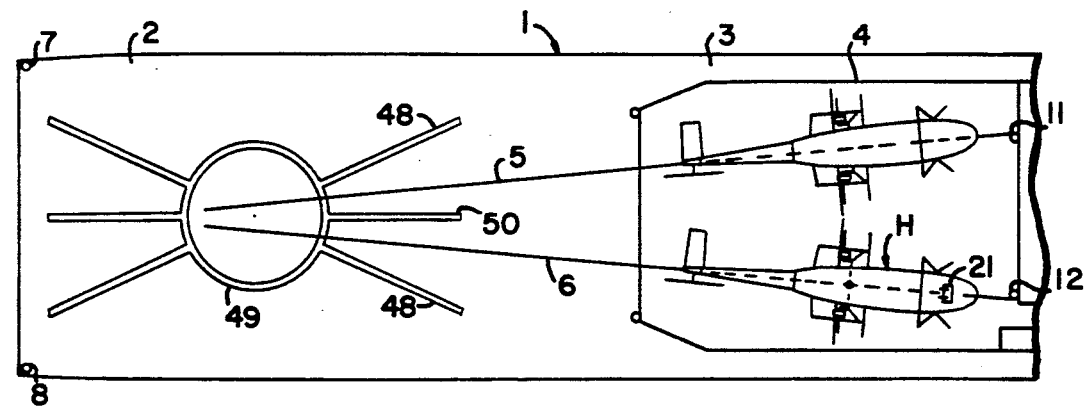

It then remains to secure the helicopter H and to detach the two cables 9 and 10 from the wheels of the principal undercarriages of the helicopter H (FIG. 6).

Figure 8:
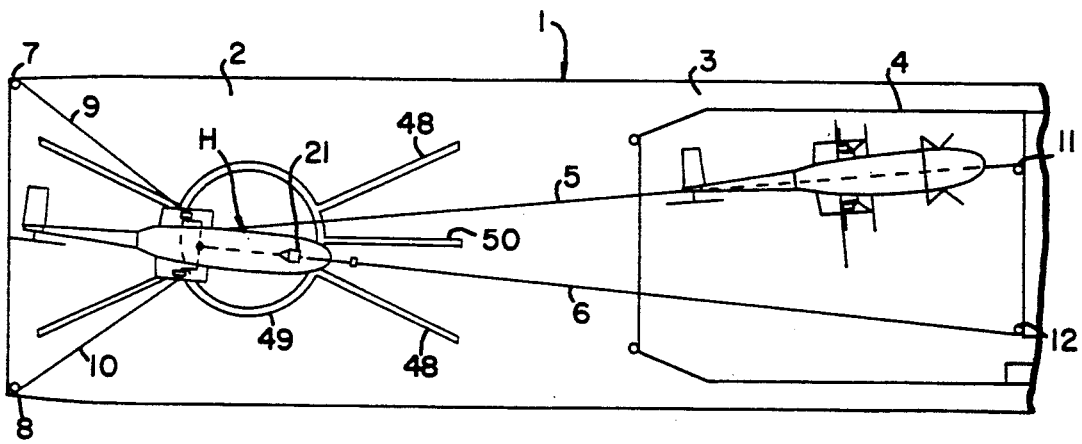
Figure 9:
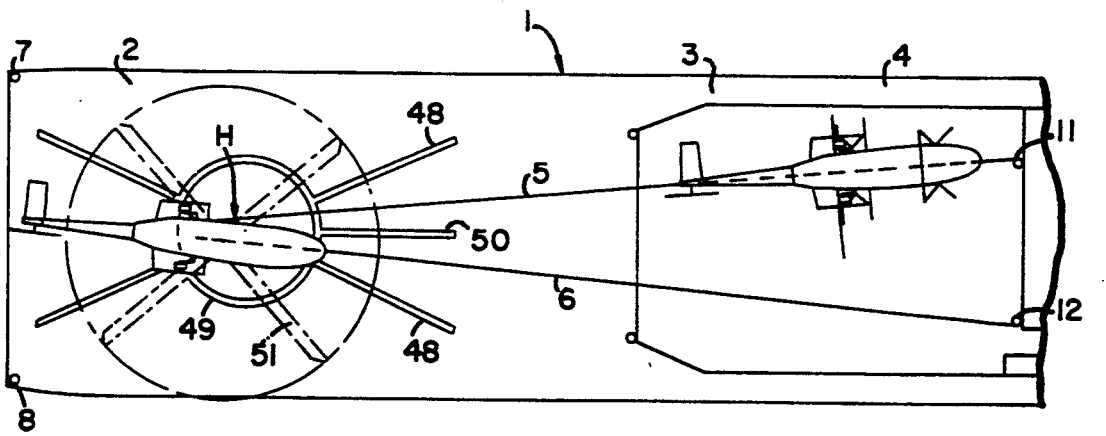

When it is desired to bring out the helicopter H from the hangar 4 in order to transfer it to its take-off area 2, operations are carried out in a way that will now be described and which correspond more especially to the steps shown in FIGS. 7 to 9.

Figure 10:
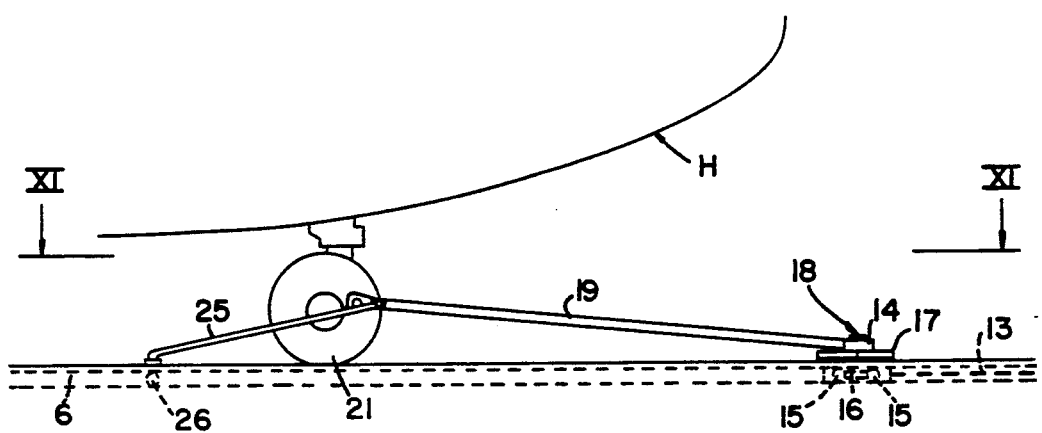
FIG. 10 is a side view of a detail of the device in accordance with the invention.
Figure 11:
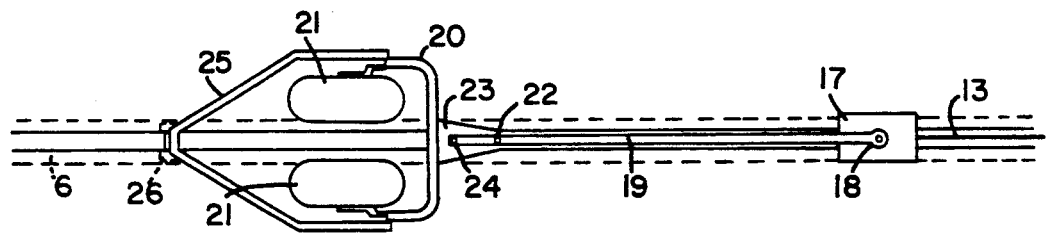
FIG. 11 is a view along the line XI—XI of FIG. 10.

To begin with, preparations are made for handling the helicopter H by carrying out in succession the following tasks:
the towing bar 19 and the holding trolley 28 being still in place with respect to the helicopter H, the mini-fork 25 is fixed on to the fork 20, the roller 26 being disposed in the guide rail, behind the auxiliary undercarriage and the wheels 21, as shown in FIGS. 10 and 11;
the two cables 9 and 10 of the winches 7 and 8 are fixed on to the abovementioned mooring rings disposed on the axes of the wheels of the principal undercarriages 40;
the helicopter is freed from its means of mooring in the hangar 4;
the cables 9 and 10 and the cable 13 of the trolley 14 are progressively put under tension, e.g. in the case of the abovementioned type of helicopter, by assigning tensions of 500 daN to the lateral cables 9 and 10 and a tension of about 1000 daN to the cable 13. Here again, these forces are to be adjusted as a function of the type and weight of the helicopter.

Figure 7:
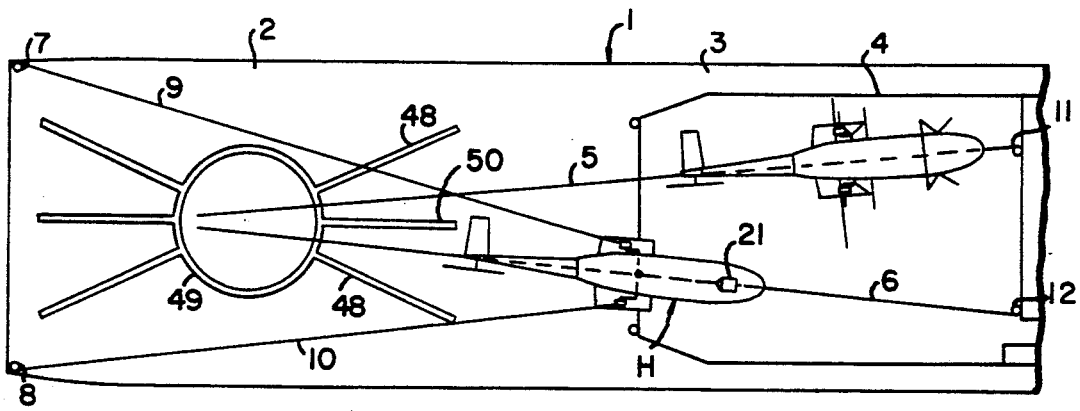
FIGS. 7 to 9 are diagrammatic steps in maneuvering a helicopter during its transfer from its parking area to its alighting area with a view to take-off.

The helicopter H is then backed towards the take-off area 2 of the platform by progressively increasing the force in the cables 9 and 10 up to, for example, a maximum of 800 daN (FIG. 7). When the holding trolley 28 reaches the end of the guide rail 6, the backing operation is stopped (FIG. 8). The helicopter H is then moored by the rings located on the axis of the main wheels, outer side, and it is secured by two lateral structural points in the front and rear.

It is then necessary to uncouple the helicopter H from the holding arm 35, from the mini-fork 25 and from the towing bar 19, and to free the said helicopter H from the two cables 9 and 10. The holding arm 35 is then made to pivot on the trolley 28, in its locked position, in order to dispose it substantially parallel to the axis of the guide rail 6. There may be provided means of the automatic pawl and ratchet mechanism type (not shown) making it possible to immobilize the point 30, and thus the bearing 34 and the arm 35, in this particular directional position of the arm 35 in relation to the trolley 28, in order that, under the effect of movements of the platform, the arm 35 cannot pivot and come to strike the principal undercarriages 40 during the take-off phase. The towing trolley 14 and the towing bar 19 are then brought back into the hangar 4.

It then remains to unfold the blades 51 of the helicopter H, to remove the lashings and moorings. The helicopter H, after the engines have been started up, is ready to take off. The platform 1 is then cleared after take-off, by returning the holding trolley 28 to the hangar 4.

The device according to the invention has been described above in its application to maneuvering a helicopter equipped with a tricycle landing gear comprising two wheeled principal lateral undercarriages together with an auxiliary forward undercarriage with swingable but non-piloted wheels. However, this device may also be used to maneuver helicopters whose landing gear comprises two wheeled principal lateral undercarriages at the front and a rear swingable wheel supported under the tail of the helicopter. In the latter case, the maneuver, performed as described above with the same equipment for the device specific to the invention, requires the helicopter to be subjected to only one additional operation after it has alighted and before its rotors have been stopped. This additional operation consists in making the helicopter carry out substantially a half-turn by pivoting it around itself through about 180° by control of the rotation of the rear rotor in order to place it in a position in which the rear swingable wheel is near whichever of the rails 5 or 6 it is desired to use, and in the direction of the hangar 4 with respect to the main undercarriages which are, for their part, turned towards the rear lateral winches 7 and 8. In this way, the initial conditions for the maneuvering of a helicopter with a front auxiliary undercarriage having a swingable wheel or wheels are obtained once again for the transfer of the helicopter with a rear swingable wheel to the hangar 4. Similarly, after leaving the hangar 4 and returning to the area 2 with a view to take-off, it is necessary once again to make the helicopter pivot around itself through substantially a half-turn in order to give it the correct heading for take-off before carrying out the latter operation.

The invention is not limited to the specific disclosed embodiments but is defined by the following claims.

We claim:

1. In a device for maneuvering a flying machine supported by a principal landing gear and at least one swingable wheel, between two pre-determined zones on a substantially plane platform, such as an alighting area and a parking area on the deck of a ship, this device comprising at least one guide rail extending from one zone of the platform to the other, a hauling mechanism adapted to pull the machine from one zone to the other, an orientation bar for orienting the path of the machine, intended to be pivotably connected by one of its ends to the swingable wheel of said machine, with means of automatically locking the orientation bar with respect to the swingable wheel such that the axis of the orientation bar lies substantially in a plane parallel to or coincident with the median plane of the swingable wheel, its other end sliding along the guide rail, and at least one holding trolley suitable for movement along the guide rail, this holding trolley being associated with means of connection, said means of connection comprising:

a holding arm associated with means of attaching each of its ends to at least one of a plurality of lateral structural mooring points of the machine, said lateral structural mooring points being disposed on both sides of a vertical median plane of a fuselage of the machine close to lateral supporting struts of wheels of the principal landing gear thereof, and with means of supporting each of its ends on the plane plateform;

a connecting unit mounted on the holding trolley on which said holding arm may slide between its two ends, said connecting unit maintaining said holding arm with respect to said holding trolley;

means for automatically locking said connecting unit with respect to the holding arm in a position corresponding substantially to the centering of the machine on the guide rail;

means for pivoting which permit the pivoting of the holding arm with respect to the holding trolley around an axis substantially perpendicular to the platform, wherein said hauling mechanism comprises a towing winch located toward one end of a guide rail, upon which is wound a cable which is connected to a mounted towing trolley, said towing trolley movable along the guide rail and having said orientation bar articulated thereupon at an end of the towing trolley furthest from the machine, whereby the orientation bar is used as a towing bar.

2. A device according to claim 1 wherein the orientation bar is connected to the said swingable wheel by means of a fork mounted on the axis of the said swingable wheel.

3. A device according to claim 2 wherein the orientation bar is articulated so as to pivot on the fork.

4. A device according to claim 1 wherein the orientation bar is of adjustable length.

5. A device according to claim 1, wherein the guide rail is a hollow rail within which the cable connected to the towing trolley extends.

6. A device according to claim 1, comprising two lateral winches on which are wound cables intended to be connected laterally to the machine, these lateral winches being disposed on the platform in whichever of the two zones is opposite the zone in which the towing winch is disposed.

7. A device according to claim 1, wherein the means of attachment of one end of the holding arm to a lateral structural mooring point comprises at least one rod, adjustable in length.

8. A device according to claim 1, wherein the holding arm is equipped, towards one of its ends, with at least one wheel intended to rest on the platform.

9. A device according to claim 1, wherein on the holding trolley is mounted a pivot which carries a cylindrical or parallelepidedal-shaped bearing with its axis substantially perpendicular to the axis of the pivot, said bearing receiving into its interior the holding arm, and being the connecting unit with respect to which said holding arm is mounted so that it can slide.

10. A device according to claim 1, wherein the means for locking comprise a pin extending, in a locked position, partially into a first recess cut into the connecting unit and partially into a second recess cut on the holding arm, said pin being completed disposed in an unlocked position in one of these two recesses and being associated with elastic means tending to push the pin out of said one of two recesses towards that of the connecting unit or of the holding arm in which the other recess is cut.

11. A device according to claim 10, wherein the recess in which the pin is disposed in its unlocked position is cut into the connecting unit.

12. A device according to claim 10, further comprising means for manually unlocking said means for automatically locking said connecting unit with respect to the holding arm.

13. A device according to claim 12, wherein the means for manual unlocking comprise an outer pull handle connected to the pin and intended to be grasped by an operator.

14. A device according to claim 1, further comprising auxiliary means for guiding said at least one swingable wheel along the guide rail.

15. A device according to claim 14, wherein said auxiliary means comprise a fork intended for mounting on an axis of the swingable wheel by means of a bar, said fork being provided at one of its ends with a roller sliding along the guide rail.

* * * * *